United States Patent
Komarov

(10) Patent No.: US 9,411,890 B2
(45) Date of Patent: Aug. 9, 2016

(54) GRAPH-BASED SEARCH QUERIES USING WEB CONTENT METADATA

(75) Inventor: Andrey Komarov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1043 days.

(21) Appl. No.: 13/488,555

(22) Filed: Jun. 5, 2012

(65) Prior Publication Data

US 2013/0268533 A1    Oct. 10, 2013

Related U.S. Application Data

(60) Provisional application No. 61/619,993, filed on Apr. 4, 2012.

(51) Int. Cl.
G06F 17/30 (2006.01)

(52) U.S. Cl.
CPC .... G06F 17/30864 (2013.01); G06F 17/30958 (2013.01)

(58) Field of Classification Search
CPC .......... G06F 17/30864; G06F 17/30958; G06F 17/30997; G06F 17/30722; G06F 17/30887; G06F 17/30277; G06F 17/30696; G06F 17/30979

See application file for complete search history.

(56) References Cited

U.S. PATENT DOCUMENTS

| | | | |
|---|---|---|---|
| 5,581,663 A * | 12/1996 | Zlotin | G06N 5/003 706/11 |
| 8,166,029 B2 * | 4/2012 | Park et al. | 707/732 |
| 2003/0061209 A1 * | 3/2003 | Raboczi et al. | 707/3 |
| 2005/0015240 A1 * | 1/2005 | Appleby | G06F 17/2827 704/9 |
| 2007/0294289 A1 * | 12/2007 | Farrell | 707/103 R |
| 2008/0052379 A1 * | 2/2008 | Matsuyama | H04L 41/22 709/218 |
| 2008/0126303 A1 * | 5/2008 | Park et al. | 707/3 |
| 2010/0241649 A1 * | 9/2010 | Lewak | G06F 17/30997 707/767 |
| 2012/0209886 A1 * | 8/2012 | Henderson | G06F 17/30557 707/798 |

* cited by examiner

Primary Examiner — Angelica Ruiz
(74) Attorney, Agent, or Firm — Fish & Richardson P.C.

(57) ABSTRACT

Methods, systems, and apparatus, including computer programs encoded on a computer storage medium, for generating search query metadata for a graph search query for use in selecting web pages relevant to the graph search query. In one aspect, a method includes receiving a graph search query specifying user-selected graph search elements; generating graph search query metadata representing the graph search elements of the graph search query and relationships of the graph search elements; comparing the graph search query metadata to content metadata sets, wherein each content metadata set represents content elements of a content item presented on a respective web resource and relationships of the content elements; determining similarity scores between the content metadata sets and the graph search query metadata based on the comparison; and selecting web resources on which the content items are presented based on the similarity scores of the respective content metadata sets.

16 Claims, 6 Drawing Sheets

GRAPH-BASED SEARCH QUERIES USING WEB CONTENT METADATA

CROSS-REFERENCE TO RELATED APPLICATIONS

This application claims priority under 35 U.S.C. §119(e) to U.S. Provisional Application Ser. No. 61/619,993 titled "Graph-Based Search Queries Using Web Content Metadata" filed Apr. 4, 2012, the disclosure of which is incorporated herein by reference in its entirety.

BACKGROUND

This specification relates to web-based information retrieval and presentation.

The Internet provides access to a wide variety of resources, e.g., video or audio files, web pages for particular subjects, book articles, and news articles. Resources include a variety of content types, for example, textual content and graphical content (e.g., graphical objects, for example, charts and tables). A search system can identify resources in response to a search query that includes one or more search terms (e.g., one or more words). The search system ranks the resources based on measures of relevance of the resources to the search query and on measures of quality of the resources. In turn, the search system selects a quantity of the ranked resources and provides search results that reference the selected resources (e.g., provide links to the selected resources).

SUMMARY

In general, one aspect of the subject matter described in this specification can be embodied in methods that include the actions of receiving a graph search query specifying user-selected graph search elements, each graph search element corresponding to one of a graph node or graph edge connecting graph nodes; generating graph search query metadata representing the graph search elements of the graph search query and relationships of the graph search elements of the graph search query; comparing the graph search query metadata to content metadata sets, wherein each content metadata set represents content elements of a content item presented on a respective web resource and relationships of the content elements; determining similarity scores between the content metadata sets and the graph search query metadata based on the comparison; and selecting one or more of the web resources on which the content items are presented based at least in part on the similarity scores of the respective content metadata sets.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A tool can be provided to users (e.g., on a search system web page) to allow users to construct or generate a graph search query to visually represent a user's search query to improve the effectiveness of the search query as related to causing search results to be returned that satisfy the users' informational needs. Users can generate or construct a graph search query having nodes and edge connections that specify query subject matter and relationships between (of) the subject matter to specifically define a search query.

The graph search query allows a user to particularly specify relationships between query subject matter that might be difficult to do in a text string only search query. The subject matter and the subject matter relationships specified by the graph search query can be used by the search system to increase the likelihood (e.g., as compared to a text only search query without such defined relationships) the search system will identify web resources most relevant to the user's query. Increasing the likelihood that the search system identifies web resources most relevant to the user's query also reduces the burden on the search system as it is likely fewer queries will need to be submitted to satisfy the user's informational needs. The graph search query can be used in conjunction with a text search query to enhance the text search query or it can be used without the text search query.

A tool (e.g., web page) can be provided to web site custodians to allow the custodians to generate content metadata sets for content items, e.g., graphical objects on their web resources. The content metadata sets can be embedded in the web resources having the content items or otherwise linked to the content items such that a search system can access the content metadata sets. A content metadata set represents the subject matter of the content item and relationships between (of) the various portions of the subject matter. For example, the content metadata sets can represent the underlying data model of the content item, which after being embedded in the web resource, allows the data and the data relationships of the content item to be accessible to the search system where it would otherwise not be accessible.

Generating the graph search query metadata and comparing the graph search query metadata to content metadata sets from content items allows a search system to account for the underlying data (e.g., data model) on which the content items are based, which are not otherwise accessible or interpretable by the search system. The search system can use this underlying data and the specificity provided by the graph search query to identify or rank web resources, or both, as relevant to the search query to enhance the effectiveness of the search system in identifying relevant resources or ranking the resources.

As such, generating and making the content metadata sets available or accessible to the search system provides additional information about the web resource to the search system which may result in the web resource being identified as relevant to a search query where it might not otherwise have been so identified. This may lead to additional sales or brand awareness if the web resource is a sales or advertising page.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
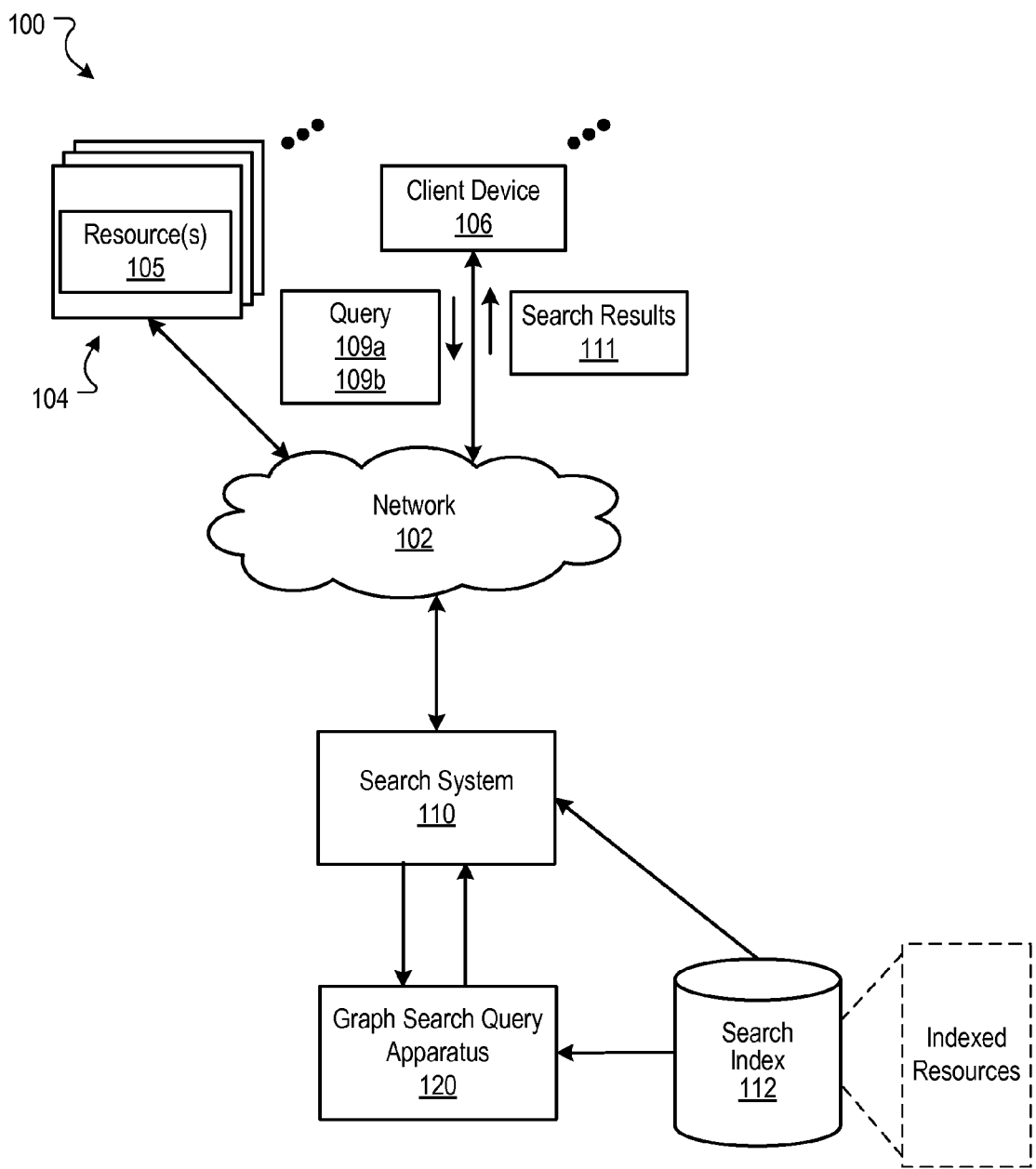
FIG. 1 is a block diagram of an example environment in which a search system provides search services.

This specification generally relates to generating and using graph search queries to request relevant resources (e.g., web pages) through a search system (e.g., search engine). A graph search query is a query that includes a graph having graph nodes representing query subject matter and graph edges connecting the graph nodes and representing relationships between the graph nodes (e.g., between the query subject matter represented by the graph nodes). For example, a graph search query can be flow chart with stages (e.g., graph nodes) of the flow chart linked by arrows (e.g., graph edges) that connote an ordinal relationship among the flow chart stages. The graph nodes and graph edges can be assigned attributes. For example, a graph node can be assigned a label and a graph edge can be assigned a direction.

A user generates a graph search query by selecting graph search elements (e.g., graph nodes and graph edges) from a visual palette of graph search elements, for example, presented on a search engine page. The user selects the desired graph search elements to construct or generate a graph search query, for example, to request relevant resources from a search system.

Once the graph search query has been constructed, the search system generates graph search query metadata representing the graph search query. For example, the graph search query metadata can be a signature, fingerprint or other mathematical representation (e.g., adjacency matrix) of the graph search query or, more generally, the graph object represented by the graph search query. Such a mathematical representation is well suited for data types of modern programming languages and transmission across a communication network. An example signature or fingerprint is a data compressed and structured form of the graph search query suitable for communication across the Internet.

The search system compares the graph search query metadata with content metadata sets from content items (e.g., graphical objects on web resource) to determine similarities between the graph search query metadata and the content metadata sets, which can be used to determine if a content item (and the web resource having the content item) are relevant to the graph search query. Each content metadata set represents content elements of a content item presented on a resource where the content item is supported by an underlying data model (e.g., structured data in a relational database). The content item can be a graphical object, for example, a chart or table presented on a web page where the content (e.g., subject matter) of the content item is derived from data in a data model. The content elements are the graph nodes (e.g., blocks in a flow chart) and graph edges (e.g., lines connecting the flow chart blocks) of the graphical object. The search system selects resources relevant to the graph search query based at least in part on the comparisons of the graph search query metadata with the content metadata sets from the content items presented on the resources.

FIG. 1 is a block diagram of an example environment in which a search system provides search services. The example environment 100 includes a network 102, e.g., a local area network (LAN), wide area network (WAN), the Internet, or a combination of them. The network 102 connects Websites 104, client devices 106, and the search system 110. The environment 100 may include many thousands of websites 104 and client devices 106.

A Website 104 is one or more resources 105 associated with a domain name and hosted by one or more servers. An example Website is a collection of Web pages formatted in hypertext markup language (HTML) that can contain text, images, multimedia content, and programming elements, e.g., scripts. Each Website 104 is maintained by a publisher or website custodian, e.g., an entity that manages and/or owns the Website.

A resource 105 is any data that can be provided by a Website 104 over the network 102 and that is associated with a resource address. Resources 105 include HTML pages, word processing documents, and portable document format (PDF) documents, images, video, and feed sources, to name just a few. The resources 105 can include content, e.g., words; content items, e.g., graphical objects (e.g., tables and charts); phrases; images and sounds and may include embedded information (e.g., metadata and hyperlinks) and/or embedded instructions (e.g., scripts).

A client device 106 is an electronic device that is under control of a user and is capable of requesting and receiving resources 105 over the network 102. Example client devices 106 include personal computers, mobile communication devices, and other devices that can send and receive data over the network 102. A client device 106 typically includes a user application, e.g., a web browser, to facilitate the sending and receiving of data over the network 102.

To facilitate searching of resources 105, the search system 110 identifies the resources 105 by crawling and indexing the resources 105 provided on Websites 104. Data and content about the resources 105 can be indexed based on the resource to which the data and content correspond. The indexed and, optionally, cached copies of the resources 105 are stored in search index 112.

The client devices 106 submit search queries 109 (e.g., graph search queries 109a and text search queries 109b) to the search system 110. For example, any particular text search query 109b can include one or more terms consisting of words, numbers or other characters. By way of another example, a graph search query 109a can include a set of graph nodes and graph edges with each graph node representing a topic or subject matter of the query and each graph edge representing a relationship among the graph nodes. Graph search queries 109b are described in more detail below.

In response to receipt of the search query 109, the search system 110 accesses (e.g., using a search engine) the search index 112 to identify resources 105 that are relevant to the search query 109. The search system 110 identifies the resources 105, generates search results 111 that identify or reference the resources 105, and returns the search results 111 to the client devices 106.

For example, the search results 111 can include resources 105 that have been identified as having at least a threshold relevance score to the content or subject matter of the search query 109 (e.g., the search query terms). A search result 111 is data generated by the search system 110 that identifies or references a resource 105 that is responsive to a particular search query 109, and includes a link to the resource 105. An example search result 111 can include a Web page title, a snippet of text or a portion of an image extracted from the Web page, and the URL of the Web page.

The search results can be ranked based on relevance scores of the resources 105 identified by the search results 111 to the content or subject matter of the search query. The relevance scores can be computed, for example, based on information retrieval ("IR") scores, and optionally a quality score of each resource relative to other resources. In some implementations, the IR scores are computed from dot products of feature vectors corresponding to a search query 109 and a resource 105. For example, graph search query metadata (represented in a mathematical form, e.g., a matrix, list, array or vector) is compared to content metadata sets (represented in mathematical forms, e.g., matrices, lists, arrays or vectors) associated with resources 105 identified by the search results 111. The distances (e.g., as determined by a distance function) between the mathematical representations of the graph search query metadata and the content metadata sets can be used as IR scores. This comparison is described in more detail below.

Quality scores can be computed, for example, based on visual characteristics of the page (e.g., page layout, font sizes, and a quantity of images presented on the page). The quality scores can also be computed based on user feedback regarding page quality and/or a determination of whether the page includes, or links to a page that includes, malware (e.g., computer viruses). The search results 111 are ordered according to these relevance scores and provided to the client device 106 for presentation according to the order. The client devices 106 receive the search results 111, e.g., in the form of one or more search result pages, and render the search results 111 for presentation to users.

In some implementations, the example environment 100 includes a graph search query apparatus 120. The graph search query apparatus 120 can be part of the search system 110 or a separate apparatus. For convenience herein, references to the graph search query apparatus 120 performing an operation or action can apply to the graph search query apparatus 120 being an apparatus separate from the search system 110 or part of the search system 110. The graph search query apparatus 120 facilitates the identification of resources 105 relevant to graph search queries, as described below.

Figure 2A:
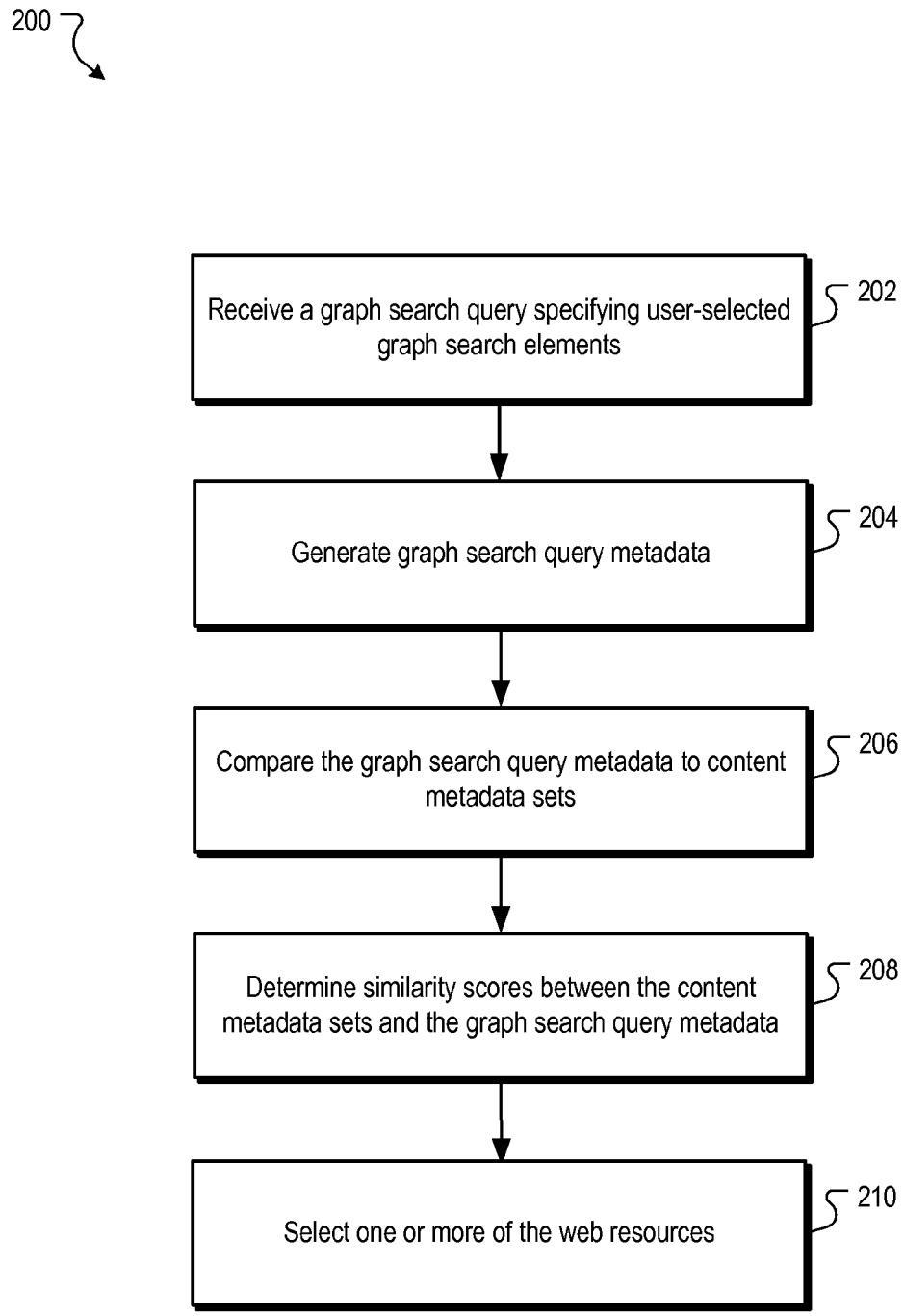
FIG. 2A is a flow diagram of an example process for selecting web resources based on graph search queries.

One example process by which the graph search query apparatus 120 selects web resources as relevant to a graph search query is described with reference to FIG. 2A, which is a flow diagram of an example process 200 for selecting web resources based on graph search queries.

Figure 2B:
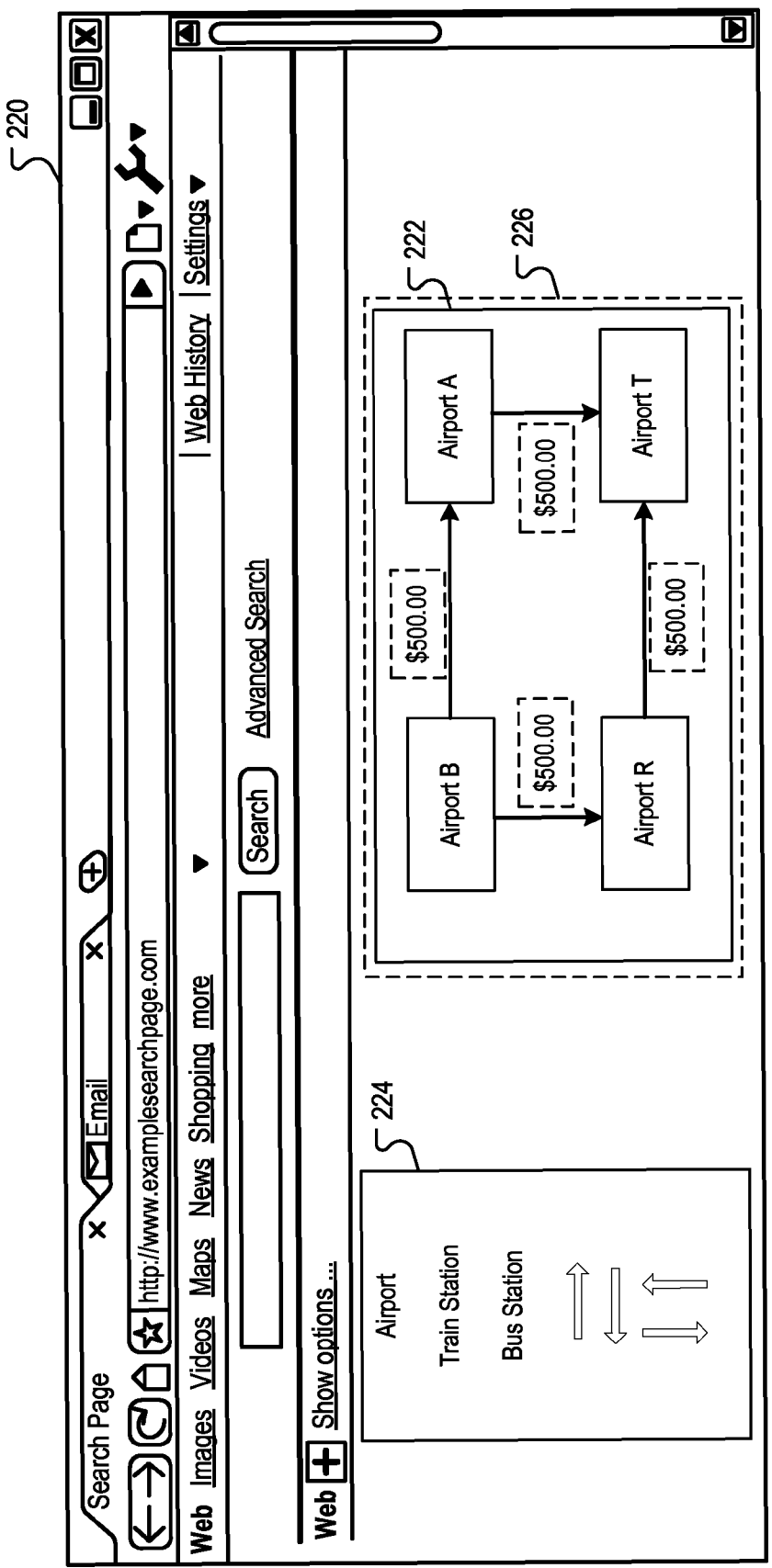
FIG. 2B is a screen shot of an example search page in which a graph search query is generated.

The process 200 receives a graph search query specifying user-selected graph search elements (202). For example, the graph search query apparatus 120 receives the graph search query. In some implementations, a user uses a client device 106 to submit data specifying a graph search query 109a to the graph search query apparatus 120. A graph search query 109a is a query that includes a graph having graph nodes representing query subject matter and graph edges connecting the graph nodes and representing relationships between the graph nodes. Graph search queries 109a are described with reference to FIG. 2B, which is a screen shot of an example search page 220 in which a graph search query 222 is generated.

In some implementations, a user, through a client device 106, requests from the graph search query apparatus the search page 220. In response to the request, the search system 110 or the graph search query apparatus 120 provides the search page 220 to the client device 106. The search page 220 can include a user selectable graph search query request menu (not shown) or other indicator that a user desires to construct a graph search query. In some implementations, the user selectable graph search query request menu can also include a field or selection option through which the user can indicate the subject matter of the user's search query, as described below.

In response to the selection of the graph search query request button or other indicator, the graph search query apparatus 120 provides user interface data to the client device 106 to cause the client device to display a graph search query input menu 224 (e.g., an interactive user interface tool). For example, selection of the button causes the client device 106 to display the graph search query menu 224. In some implementations, the graph search query apparatus 120 (or more generally the search system 110) causes the script or instructions to be included in the web page (e.g., a script embedded in an HTML web page). However, in other implementations, the graph search query apparatus 120 causes the client device 106 to display the graph search query menu 224 through a sequence of one or more requests from the client device 106 and one or more responses from the graph search query apparatus 120.

For convenience herein, whether the client device 106 takes action based on a script or other instructions included in the search page 220 provided by the graph search query apparatus 120 or takes action through a sequence of requests and responses with the graph search query apparatus 120, the graph search query apparatus 120 will be described as causing the client device 106 to take such actions.

The graph search query menu 224 is a menu or palette of selectable graph search elements. Graph search elements are elements that can be selected by a user using the client device 106 to construct a graph search query. For example, the graph search elements include graph nodes and graph edges. The graph nodes represent query subject matter (e.g., the subject matter(s) or topic(s) of the user's query) and the graph edges connect the graph nodes and represent relationships between the graph nodes.

In some implementations, the graph search query menu 224 includes only a subset of all graph search elements. The graph search query apparatus 120 can determine which graph search elements to cause the client device 106 to include in the graph search query menu 224 based on the user's characterization or indication of the subject matter of the query. For example, the user can choose or indicate a subject matter category to which the user's query belongs. In some implementations, the user can select a category from the user selectable graph search query request menu as referenced above, e.g., a drop down menu, displayed on the search page 220 listing different categories of subject matter or by entering a subject matter category of the query in a text input field (not shown) displayed on the search page 220.

This category data can be sent to the graph search query apparatus 120 by the client device 106. In some implementations, the graph search query apparatus 120 receives the category data and determines or selects which subset of graph search elements are related to the selected category and causes the client device 106 to display a graph search query menu with the subset of graph search elements from which the user can select. The graph search query apparatus 120 can determine a graph search element to be related to a category based on pre-defined classifications of the graph search elements as belonging to certain categories. However, in other implementations, all graph search elements can be included in the graph search query menu 224.

Once the graph search query menu 224 has been displayed, the user can select various graph search elements to construct the graph search query. For example, if the user selected a travel category from the graph search query subject matter menu, the graph search query menu 224 includes the following graph search elements: "Airport," "Train Station" and "Bus Station," all of which are graph nodes; and up, down, left and right arrows, all of which are graph edges. However, if the user selected a category different from the travel category, the graph search menu 224 would include graph search elements related to that category, which may the same or different from "Airport," "Train Station" and "Bus Station" based on the subject matter of the different category.

The user can construct the graph search query 222 in a graph search query input field 226 on the search page 220. For example, the user may desire to find airline tickets for an upcoming trip and is interested in two different routes to the final destination and wants to conduct a search to obtain relevant flight information for these routes. For example, the two routes are Airport B to Airport T with a connection through Airport R (the "B-T-R Route") and Airport B to Airport T with a connection through Airport A (the "B-A-T Route"). Further, the user may also only want to pay a certain amount for each leg of the route (i.e., a flight from one airport to another). As such the user can select the "Airport" graph node from the graph search query menu 224 and place the "Airport" graph node in the graph search query input field 226. For example, the user can select the "Airport" graph node and drag-and-drop it in the graph search query input field 226.

Each graph node can be assigned a value or an attribute. For example, for the "Airport" graph node the value or attribute can be an airport name. Thus the user can assign a particular airport to the "Airport" graph node (e.g., "Airport B"). In a similar manner, the user can place three more "Airport" graph nodes in the graph search query input field 226 and assign attributes of "Airport A," "Airport R" and "Airport T" based on the B-T-R Route and the B-A-T Route.

The user can also place graph edges in the graph search query input field 226 to connect the graph nodes to indicate or represent a relationship between the graph nodes (e.g., to indicate the desired route between airports). For example, the user can select a right arrow from the graph search query menu 224 and place the right arrow such that it connects the "Airport B" graph node to the "Airport A" graph node to indicate the flight is from Airport B to Airport A (e.g., the first leg of the B-A-T Route). Similarly, the user can select a down arrow from the graph search query menu 224 and place the down arrow such that it connects the "Airport A" graph node to the "Airport T" graph node to indicate the flight is from Airport A to Airport T (e.g., the second and final leg of the B-A-T Route). Likewise, the user can place arrows from graph search query menu 224 between the "Airport B," "Airport R" and "Airport T" graph nodes to construct the B-R-T Route.

The user may also desire to specify target costs for each leg of the routes. The user can do so, for example, by specifying attributes for the graph edges. Thus if the user's targeted price for each leg of each route is $500.00, the user can assign attributes to each of the arrows of $500.00 (e.g., by selecting the graph edge and entering the desired attribute value in a text field). In this way, the user constructs a graph search query that graphically or visually represents the user's search query. Although in this example only four graph nodes and four graph edges are used to construct the graph search query 222, more generally, a graph search query 222 can have any number of graph nodes and graph edges and many types of attributes or values for those graph nodes and graph edges.

Further, in some implementations, the graph nodes, graph edges or both can be weighted to indicate the importance of the graph search element to the user. For example, the user can assign a weight of 0.9 to the graph edge between the graph node "Airport B" and "Airport A," and a weight of 0.6 to the graph edge between the graph node "Airport A" and "Airport T" indicating the user deems the ticket cost from "Airport B" and "Airport A" to be more important than the ticket cost from "Airport A" and "Airport T."

Thus, more generally described, upon an indication from the user (e.g., selection of a graph search query request button), the graph search query apparatus 120 provides data to the client device 106 (e.g., a script in the search page 220) to cause the client device 106 to provide an interactive user interface tool (e.g., the graph search query menu 224 and the graph search query input field 226) to the user to allow the user to select graph search elements to construct a graph search query.

Figure 2C:
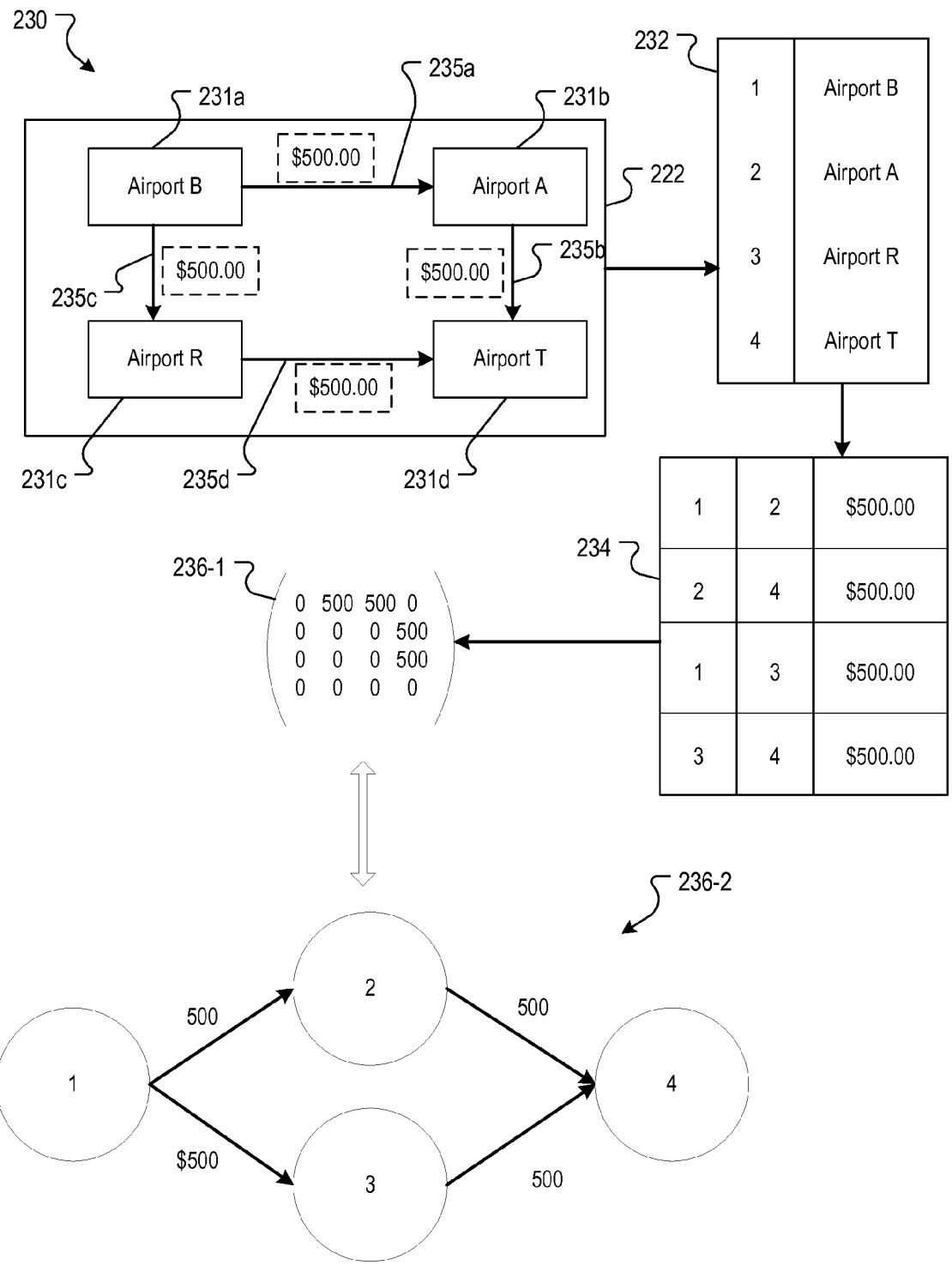
FIG. 2C is a block diagram of an example process for generating graph search query metadata.

The process 200 generates graph search query metadata representing the graph search elements of the graph search query and relationships of the graph search elements of the graph search query (204). For example, the graph search query apparatus 120 generates the graph search query metadata in response to receiving data specifying the graph search query 222 from the client device 106. The generation of the graph search query metadata is described with reference to FIG. 2C, which is a block diagram of an example process 230 for generating graph search query metadata 236.

In some implementations, the graph search query apparatus 120 generates a data model 234 based on the graph search query 222, and generates the graph search query metadata based on the data model 234. In some scenarios, the data model 234 includes data table 232 and the relationship between the respective data in the two tables 232 and 234. More generally, data models can include numerous tables and the relationships between those tables. The graph search query apparatus 120 can generate the data model 234, for example, based on graph nodes 231 (and their attributes) and the graph edges 235 (and their attributes) comprising the graph search query 222.

In some implementations, the graph search query apparatus 120 generates the data model 234 by first associating or mapping an identifier or designator to each graph node 231 based on the graph node's 231 corresponding user-assigned attribute(s) such that each graph node 231 will be associated with an identifier that is unique to the corresponding attribute. The graph search query apparatus 120 can access such identifier-attribute data from an identifier-attribute data store (not shown) or request such data from an identifier-attribute server (not shown). In some implementations, the graph search query apparatus 120 uses the graph search query subject matter category selected by the user to categorize the user's graph search query (e.g., travel category) to facilitate identification of the identifiers. For example, the identifier-attribute data can be partitioned according to subject matter category and the graph search query apparatus 120 can use the subject matter category of the graph search query indicated by the user to identify the identifiers for the graph nodes 231. Thus, based on the identifier-attribute data, the graph search query apparatus 120, for example, assigns identifiers "1," "2," "3" and "4" to graph nodes 231a ("Airport B"), 231b ("Airport A"), 231c ("Airport R") and 231d ("Airport T"), respectively (as shown in table 232).

The graph search query apparatus 120 can then use the identifiers to associate or map the relationships among the graph nodes 231a-d represented by the graph edges 235a-d (and the graph edge attributes) to generate the data model 234. For example, as the graph edge 235a represents the relationship between the graph node 231a and the graph node 231b, the graph search query apparatus 120 generates the data model 234 to reflect that relationship. As such, the first row in the data model 234 includes the identifiers for the graph node 231a (i.e., "1") and the graph node 231b (i.e., "2") and the attribute for the graph edge 235a (i.e., $500.00) because the graph edge 235a connects the graph nodes 231a and 231b.

In a similar manner the second third and fourth rows in the data model 234 are populated by the graph search query apparatus 120 to reflect the relationships between the graph node 231b (i.e., "2") and the graph node 231d (i.e., "4"); the graph node 231a (i.e., "1") and the graph node 231c (i.e., "3") and the graph node 231c (i.e., "3") and the graph node 231d (i.e., "4"); respectively.

As described above, the graph search query apparatus 120 generates the graph search query metadata 236 based on the data model 234. If weights are assigned to any graph nodes 231 or graph edges 235, the weights can be taken into account during the graph search query metadata generation process. In addition, the graph search query apparatus 120 selects rules and procedures to generate the graph search query metadata based on the subject matter category of the graph search query. For example, the graph search query apparatus 120 accesses the relevant attribute-identifier data based on the user selection of the subject matter category from the graph search query subject matter menu. By way of another example, the graph search query apparatus 120 uses a predefined set of conversion rules and procedures to generate the graph search query metadata 236 from the data model 234 based on the user-selected subject matter category.

These rules and procedures can be based on any number of techniques for generating node or matrix based-representations of structured relational data in data models. For example, such a technique can be based on row and column relationships in the data model (e.g., a row representing a particular record and columns representing various fields in the record or, more generally, relationships between data records in the data model). By way of another example, the rules and procedures can be based on adjacency or incidence matrices.

In some implementations, the graph search query apparatus 120 generates the graph search query metadata 236 in the form of a matrix 236-1, for example, an adjacency matrix or other data structures, e.g., adjacency lists implemented as arrays with one linked list for each graph node 231 having "outgoing" graph edges. The numbers of rows and columns in the matrix 236-1 correspond to the number of graph nodes 231, the elements in the matrix 236-1 correspond to the graph edges 235 between the graph nodes 231 and the values of the elements correspond to the respective attributes of the graph edges 235. For example, as the graph search query 222 has four graph nodes 231a-d and four graph edges 235a-d, the matrix 236-1 has four rows and four columns (based on the four graph nodes 231a-d), and four of the matrix elements will have values corresponding to the graph edge attributes (based on the four graph edges 235a-d). More generally, the matrix will be an N×N matrix with N being determined from the number of identifiers in the identifier-attribute data.

In some implementations, the graph search query apparatus 120 uses the data model 234 to generate and populate the matrix 236-1. For example, the graph search query apparatus 120 generates the matrix 236-1 to include a matrix element at row 1, column 2 with a value of 500, which corresponds to the first row of the data model 234 representing the graph edge 235a between graph nodes 231a and 231b having an attribute of 500. The matrix 236-1 includes a matrix element at row 2, column 4 with a value of 500, which corresponds to the second row of the data model 234 representing the graph edge 235b between graph nodes 231b and 231d having an attribute of 500. The matrix 236-1 also includes a matrix element at row 1, column 3 with a value of 500, which corresponds to the third row of the data model 234 representing the graph edge 235c between graph nodes 231a and 231c having an attribute of 500. Lastly, the matrix 236-1 includes a matrix element at row 3, column 4 with a value of 500, which corresponds to the fourth row of the data model 234 representing the graph edge 235d between graph nodes 231c and 231d having an attribute of 500. All other elements in the matrix 236-1 have a null value (i.e., 0) as they do not have corresponding graph edges 235.

The graph search query apparatus 120 can also represent the graph search query metadata 236 as a metadata node graph 236-2. The metadata node graph 236-2 includes nodes corresponding to the graph nodes 231 as labeled by their respective identifiers (i.e., 1-4), and connections connecting the nodes corresponding to the graph edges 235. However, regardless of the particular form of the search query metadata 236, the search query metadata 236 is a structured representation of the graph search query, which can be used to identify relevant web resources as described below.

Figure 2D:
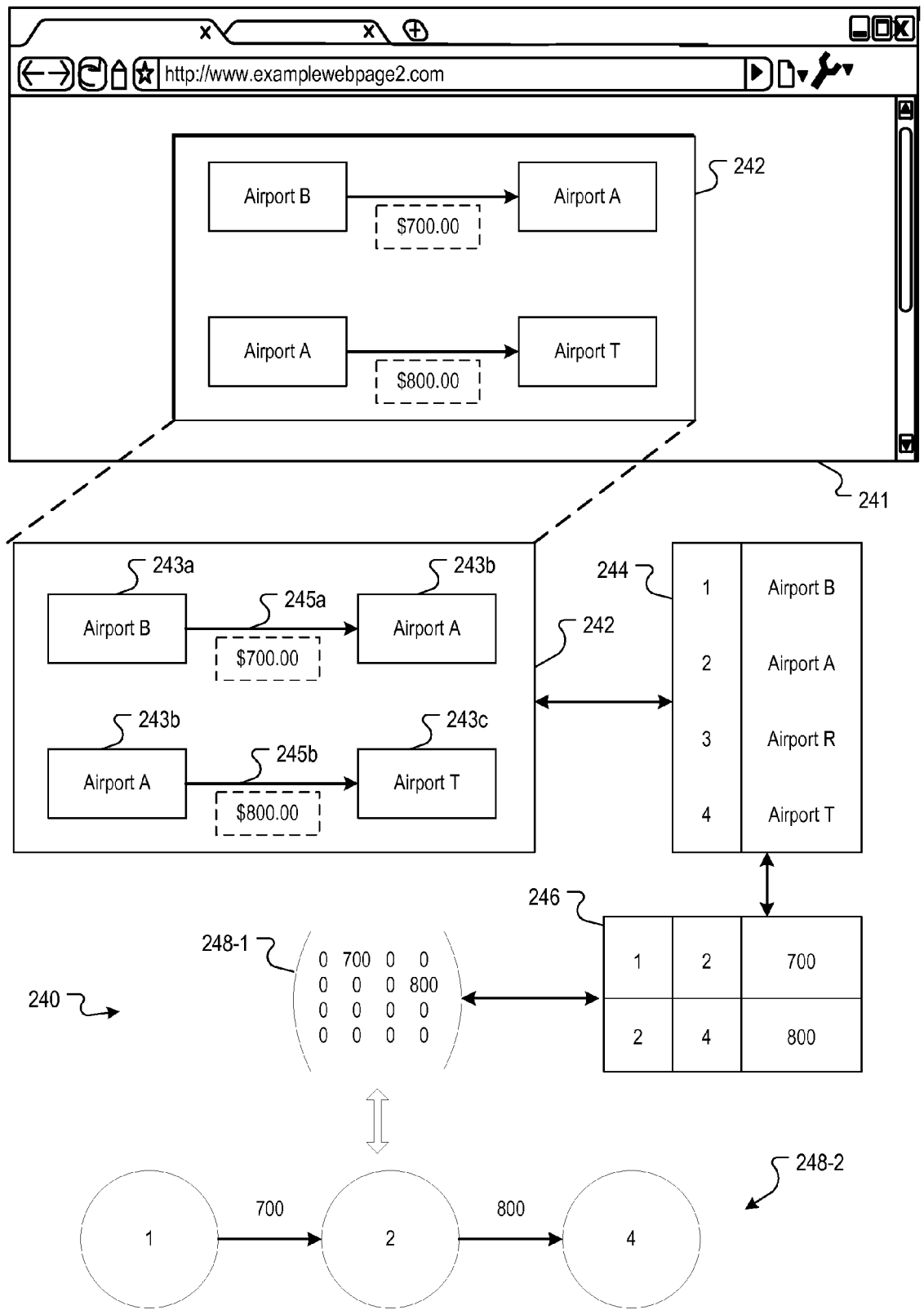
FIG. 2D is a block diagram of an example process for generating a content metadata set.

The process 200 compares the graph search query metadata to content metadata sets (206). For example, the graph search query apparatus 120 compares the graph search query metadata to content metadata sets. A content metadata set represents the content elements of a content item (e.g., a graphical object, for example, a chart) presented on a respective web resource (e.g., web page) and the relationships of the content elements (e.g., the relationship of one content element to another). The content elements are the constituent parts of the content item and are analogous to graph search elements for a graph search query. As described above, a content item is a graphical object supported by and derived from an underlying data model (e.g., structured data in a relational database). For example, the content item can be a graphical chart or table presented on a web page where the content (e.g., subject matter) of the content item is derived from data in a relational database. Content metadata sets are described with reference to FIG. 2D, which is a block diagram of an example process 240 for generating a content metadata set 248.

As shown in example screen shot 241, the content item 242 is displayed on a web resource 105. For example, the content item 242 is a chart from a web page for Airline X and illustrates two flight routes and the ticket prices for each of the routes. One flight route is from Airport B to Airport A, with a ticket price of $700.00, and one is from Airport A to Airport T, with a ticket price of $800.00. The subject matter of the content item 242 is derived from the underlying data model 246, which, can include and be based on the identifier-attribute data 244 (e.g., identifier-attribute data in table form). For example, because the content item 242 is related to travel, the identifier-attribute data 244 from which data model 246 includes and is based on can be the same as that from which the data model 234 (for the graph search query 222) is includes and is based on (i.e., attribute-identifier data 232). In some scenarios, a list of public airport codes (e.g., attribute identifier data 244) is the same for all travel web sites and it exists in the data models for the relevant contents items presented on those travel web sites. As described above, this same list of public airport codes can also be used when generating graph search query metadata for graph search queries related to travel (e.g., data table 232 for graph search query metadata 236 for graph search query 222).

In some scenarios, the data model 246 is generated by a custodian for the web page on which the corresponding content item 242 is displayed. Given the structure and format of many resources 105 (e.g., web pages) the data model 246 is detached from the content item 242 so the data model 246 is not readily accessible or accessible at all by the search system 110 through the resource 105 (e.g., the data model is not embedded within the web page). Further, as described above, the subject matter and relationships among the subject matter visually conveyed by the content item 242 (e.g., the chart) may not be readily interpretable by the search system 110. Thus the search system 110 cannot utilize the rich data in the data model 246 in determining if the web page on which the content item 242 is presented is relevant to a search query.

To facilitate the data in the data model 246 being accessible to the search system 110 (and, hence, the subject matter and relationships conveyed by the content item 242 to be considered by the search system 110) web resource custodians can choose to share some or all of the data model 246 with the graph search query apparatus 120. In turn, in some implementations, the graph search query apparatus 120 can provide web resource interface data to client devices 106 of the web resource custodians sharing data models 246. The web resource interface data causes the client device 106 to present an interactive tool that converts the shared portion of the data model 246 to into a content metadata set for the content item. This content metadata set can be shared with or made available to the search system 110. For example, the content metadata set can be embedded in the web resource 105 for the content item 242, and can be accessed by the search system 110 through the web resource 105.

In some implementations, the interactive tool is implemented in a webpage with embedded scripts that convert the shared portion of the data model 246 to a content metadata set. However, in other implementations, the interactive tool can be a standalone software application (e.g., provided by or available from the graph search query apparatus 120) that the web resource custodians locally install on their client devices 106. For convenience, whether the operations and actions of the interactive tool are carried out locally at a client device 106 or by the graph search query apparatus 120, the interactive tool will described as performing the operations and actions.

The interactive tool can use information about the data model 246 to convert the shared portion of the data model 246 to a content metadata set. For example, the graph search query apparatus 120 (or the interactive tool directly) can receive data from a web resource custodian indicating the subject matter or topic of the data in the data model 246 or can determine or infer the subject matter of the content item 242 from the subject matter of other content in the web resource (e.g., textual content in the web resource). In turn, the interactive tool can use that data to select appropriate rules or procedures for generating the content metadata set (e.g., the relevant attribute-identifier information, technique for converting the shared portion of the data model, etc.). For example, the interactive tool selects the appropriate rules and procedures to generate the content metadata set based on the subject matter of the content item 242 (e.g., as indicated by the web resource custodian).

This selection of rules and procedures from which to generate the content metadata set from the data model 246 is similar to that described above with reference to generating the graph search query metadata 236 from the data model 234. Thus if the subject matter of the content item 242 pertains to travel then the rules and procedures selected and used by the interactive tool will be the same rules and procedures used to generate the graph search query metadata 236. As described below this facilitates the comparison of the graph search query metadata 236 with the content metadata sets as the metadata are generated according to the same rules and processes.

Based on the data model 246 and the selected rules and procedures (e.g., attribute-identifier data 244), the interactive tool generates the content metadata set 248. For example, the content item 242 can be analogized to a graph search query comprised of graph nodes and graph edges. As such, the content item 242 has graph nodes 243*a-c* and graph edges 245*a-b* with attributes of $700.00 and $800.00, respectively. Thus the first row in the data model 246 includes the identifiers for the graph node 243*a* (i.e., identifier "1" from the attribute-identifier data 232 and 244) and the graph node 243*b* (i.e., identifier "2") and the attribute for the graph edge 245*a* (i.e., $700.00) because the graph edge 245*a* connects the graph nodes 243*a* and 243*b*. Likewise, the second row of the data model 246 includes the identifiers for the graph node 243*b* (i.e., identifier "2") and the graph node 243*c* (i.e., identifier "4") and the attribute for the graph edge 245*b* (i.e., $800.00) because the graph edge 245*b* connects the graph nodes 243*b* and 243*c*.

In some implementations, the interactive tool generates the content metadata set 248 in the form of a matrix 248-1, for example, an adjacency matrix or other data structure, e.g., adjacency lists implemented as arrays with one linked list for each graph node 243 having "outgoing" graph edges.

In some implementations, the interactive tool accesses a database supporting the relevant resource 105 and uses the data model 246 in the database (e.g., the publically shared portion of the database) to generate and populate the matrix 248-1. For example, interactive tool generates the matrix 248-1 to include a matrix element at row 1, column 2 with a value of 700, which corresponds to the first row of the data model 246 (which can include table 244) representing the graph edge 245*a* between graph nodes 243*a* and 243*b* having an attribute of 700. The matrix 248-1 includes a matrix element at row 2, column 4 with a value of 800, which corresponds to the second row of the data model 246 representing the graph edge 245*b* between graph nodes 243*b* and 243*c* having an attribute of 800. All other elements in the matrix 248-1 have a null value (i.e., 0) as they do not have corresponding graph edges 245.

The interactive tool can also represent the content metadata set 248 as a metadata node graph 248-2. The metadata node graph 248-2 includes nodes corresponding to the graph nodes 243 as labeled by their respective identifiers (i.e., 1, 2 and 4), and connections connecting the nodes corresponding to the graph edges 245.

Figure 2E:
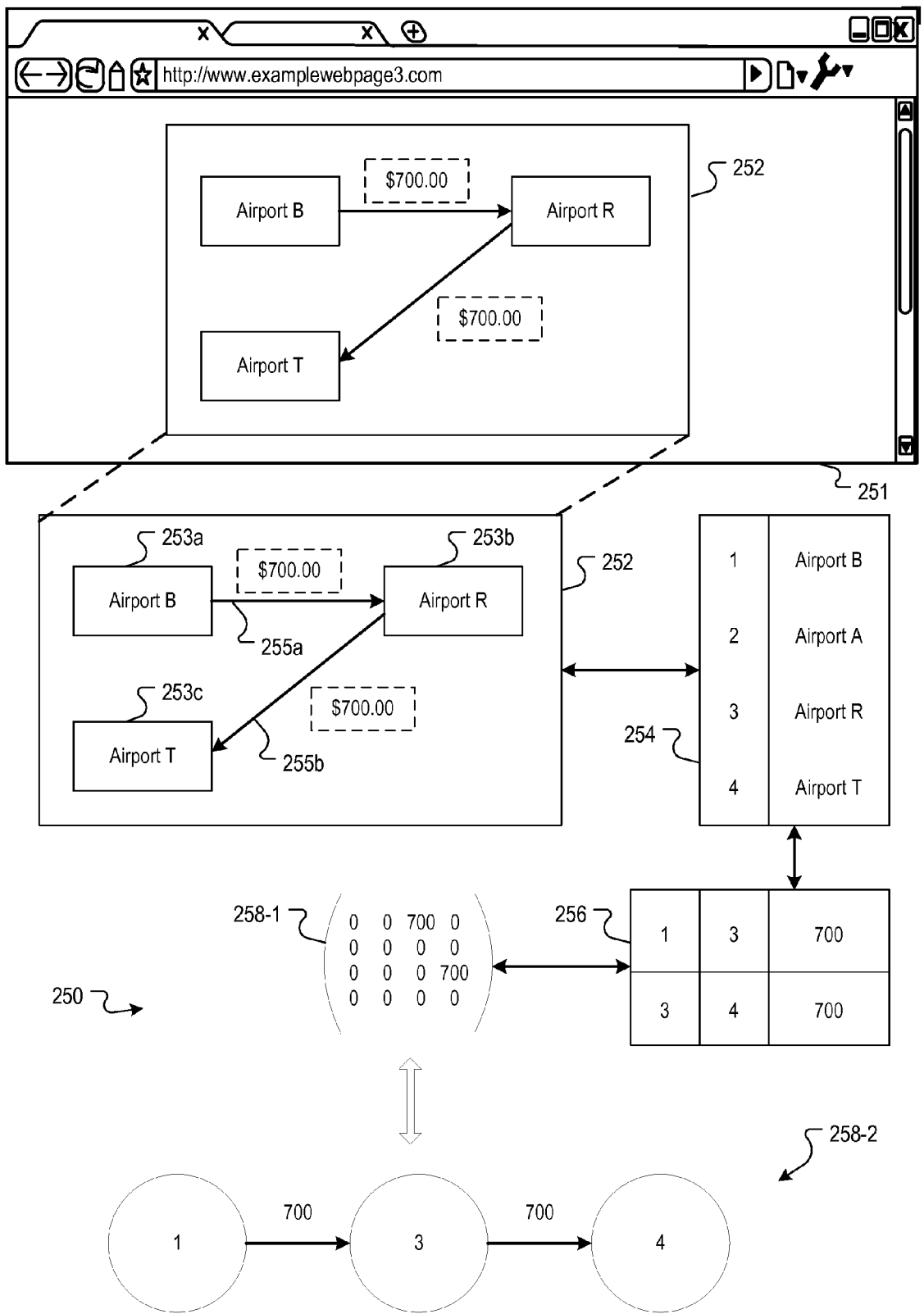
FIG. 2E is a block diagram of another example process for generating a content metadata set.

Another example content metadata set is described with reference to FIG. 2E, which is a block diagram of an example process 250 for generating another content metadata set 258.

As shown in example screen shot 251, the content item 252 is displayed on a web resource 105. For example, the content item 252 is a chart from a web page for Airline Y and illustrates a flight route and the ticket prices for each leg of the route. More particularly, the flight route is a route from Airport B to Airport T with a connection through Airport R. The ticket price for the leg from Airport B to Airport R and the leg from Airport R to Airport T are each $700.00.

The subject matter of the content item 252 is derived from the underlying data model 256, which can include and be based on the identifier-attribute data 254 (e.g., identifier-attribute data 254 in a table form). For example, because the content item 252 is related to travel, the identifier-attribute data 244 from which data model 256 is based on can be the same as that from which the data model 234 and 246 were based on.

In a similar manner to that described above with respect to the data model 246 and content metadata set 248, the interactive tool generates the content metadata set 258. As such, the content item 252 has graph nodes 253*a-c* and graph edges 255*a-b* with each graph edge 255 having an attribute of $700.00. Thus the first row in the data model 256 includes the identifiers for the graph node 253a (i.e., identifier "1" from the attribute-identifier data 244) and the graph node 253b (i.e., identifier "3") and the attribute for the graph edge 255a (i.e., $700.00) because the graph edge 255a connects the graph nodes 253a and 253b. Likewise, the second row of the data model 256 includes the identifiers for the graph node 253b (i.e., identifier "3") and the graph node 253c (i.e., identifier "4") and the attribute for the graph edge 255b (i.e., $700.00) because the graph edge 255b connects the graph nodes 253b and 253c.

In some implementations, the interactive tool generates the content metadata set 258 in the form of a matrix 258-1, for example, an adjacency matrix.

In some implementations, the interactive tool accesses a database supporting the relevant resource 105 and uses the data model 256 in the database (e.g., the publically shared portion of the database) to generate and populate the matrix 258-1. For example, the interactive tool generates the matrix 258-1 to include a matrix element at row 1, column 2 with a value of 700, which corresponds to the first row of the data model 256 (which can include table 254) representing the graph edge 255a between graph nodes 253a and 253b having an attribute of 700. The matrix 258-1 includes a matrix element at row 3, column 4 with a value of 700, which corresponds to the second row of the data model 258 representing the graph edge 255b between graph nodes 253b and 253c having an attribute of 700. All other elements in the matrix 258-1 have a null value (i.e., 0) as they do not have corresponding graph edges 255.

The interactive tool can also represent the content metadata 258 as a metadata node graph 258-2. The metadata node graph 258-2 includes nodes corresponding to the graph nodes 253 as labeled by their respective identifiers (i.e., 1, 3 and 4), and connections connecting the nodes corresponding to the graph edges 255. In some implementations, as described above, the content metadata set can be embedded in the web resource for the content item 252 (e.g., by the web resource custodians), and can be accessed by the search system 110 through the web resource. Thus as the search system 110 crawls web resources, the search system 110 (or the graph search query apparatus 120) gathers the content metadata sets and stores them in a data store.

As described above, the graph search query apparatus 120, in response to receiving data specifying a graph search query 222, compares (e.g., in terms of their mathematical representations) the graph search query metadata 236 to the content metadata sets (e.g., 248, 258). For example, the graph search query apparatus 120 can compare the matrices of the respective graph search query metadata 236 and content metadata sets (e.g., 248, 258). In some implementations, as described below, the graph search query apparatus 120 compares theses matrices using a suitable metric or distance function. As described below, based on this comparison, the graph search query apparatus 120 can determine a similarity between the content metadata sets (e.g., 248, 258) and the graph search query metadata 236, which, in turn, can be used to identify web resources 105 relevant to the graph search query 222.

The process 200 determines similarity scores between the content metadata sets and the graph search query metadata based on the comparison (208). For example, graph search query apparatus 120 determines similarity scores between the content metadata sets (e.g., 248, 258) and the graph search query metadata 222. In some implementations, the graph search query apparatus 120 employs distance functions to determine distances between the matrices for the graph search query metadata (e.g., 236-1) and each of a group of content metadata sets (e.g., 248-1 and 258-1). A distance function quantifies a distance between two sets of metadata in a metadata space. These distances can be construed as similarities (or differences) between the metadata and, hence, the graph search query 222 and the content items (e.g., 242 and 252). For example, if the distance between the matrix for the graph search query 222 and the matrix for the content item 242 is less than the distance between the matrix for the graph search query 222 and the matrix for the content item 252, then the graph search query 222 can be considered more similar to content item 242 than to content item 252.

In some implementations, the graph search query apparatus 120 selects from among numerous distance functions for a particular comparison based on the rules and procedures used to generate the graph search query 222, which is based on the subject matter of the graph search query 222 or more generally the user-selected graph search elements. For example, for graph search query 222, the graph search query apparatus 120 selects a distance function from a data store storing various distance functions classified according to the subject matter of the graph search query 222. Thus different distance functions can be used based on the subject matter of the graph search query 222 or the particular graph search elements selected by a user to construct the graph search query 222.

Equation 1 is an example distance function for determining the distance between Matrix A and Matrix B:

$$d(A, B) = \sum_{i,j}^{n} |a_{i,j} - b_{i,j}| \qquad \text{Equation 1}$$

where A={$a_{i,j}$}, B={$b_{i,j}$}, A and B are square matrices with n rows and n, i and j are the row and column coordinates, respectively, of elements in a matrix, and both i and j are integer numbers from 1 to n.

By way of an example, the distance (i.e., d1) between the graph search query metadata 236 and content metadata 248, based, respectively, in matrices 236-1 (e.g., Matrix A) and 248-1 (e.g., Matrix B1) using Equation 1 is:
for i=1, j=2: $d_{1,2}$=|500−700|=200;
for i=1, j=3: $d_{1,3}$=|500−0|=500;
for i=2, j=4: $d_{2,4}$=|500−800|=300; and
for i=3, j=4: $d_{3,4}$=|500−0|=500;
so d1=200+500+300+500=1500.

Thus the distance between matrices 263-1 and 248-1 is 1500.

In some implementations, the similarity score for a graph search query metadata/content metadata set pair is the same of the distance between the matrices for the graph search query metadata/content metadata set pair. For example, the similarity score for the graph search query metadata 236 and the content metadata set 248 is 1500.

As another example, the distance (i.e., d2) between the graph search query metadata 236 and content metadata 258, based, respectively, in matrices 236-1 (e.g., Matrix A) and 258-1 (e.g., Matrix B2) using Equation 1 is:
for i=1, j=2: $d_{1,2}$=|500−0|=500;
for i=1, j=3: $d_{1,3}$=|500−700|=200;
for i=2, j=4: $d_{2,4}$=|500−0|=500; and
for i=3, j=4: $d_{3,4}$=|500−700|=200;
so d2=500+200+500+200=1400.

Thus the distance between matrices 263-1 and 258-1 is 1400 and, hence, the similarity score for the graph search query metadata 236 and the content metadata set 258 is 1400.

Other distance functions or other techniques for determining similarity can also be used, e.g., similarity matrices.

The process 200 selects one or more of the web resources on which the content items are presented based at least in part on the similarity scores of the respective content metadata sets (210). In some implementations, the graph search query apparatus 120 selects one or more of the web resources 105 on which the content items (e.g., 242, 252) are presented based on the similarity scores of the respective content metadata sets (e.g., 248, 258). For example, given graph search query 222, the graph search query apparatus selects (or determines) the web resource 105 including the content item 252 as being more relevant than the web resource including content item 252 based the similarity score for the content item 252 indicating the content metadata set 258 for the content item 252 is closest to the graph search query metadata 236.

Visually inspecting the two content items 242 and 252 leads to the same result (content item 252 being more similar to the graph search query than content item 242) as each content item represents one of the desired routes (i.e., Routes B-A-T and B-R-T) but the ticket costs for the route depicted by content item 252 are closer to the desired ticket prices represented by the graph search query 222 than those depicted in content item 242. As such, the graph search query apparatus 120 can use the similarity scores to adjust or set the rankings of search results referencing web resources including content items having content metadata sets that have similarity scores.

In some implementations, the similarity scores determined by the graph search query apparatus 120 are used in conjunction with other metrics to select or identify relevant web resources 105. For example, in addition to the graph search query 222, a user can enter a text query (e.g., in text field on the search page 220). The graph search query apparatus 120 can receive data specifying the text query and the search terms in the text query. The graph search query apparatus 120 can then select, at least in part, web resources based on both the similarity scores and relevancy data specifying a relevancy between the search terms in the text query and the content on the web resources 105. In this way, the similarity scores can supplement or enhance the selection or identification of web resources 105 as relevant to a search query based on web resource content (e.g., graphical objects, for example, content items 242 and 252) not otherwise accessible by the search system 110.

Although the above description focused on content items (e.g., graphical objects, for example, charts and tables) with existing, underlying data models, the methods and techniques described herein can also readily extend to other types of web content that is difficult for a search system 110 to interpret or access. For example, in some social networking platforms users can complete user profile information that describes them for presentation on their user page. This profile information can pertain to user demographic information, user interests, employment history, etc. Often, a user enters some of this profile information in free form text fields. For example, a user may describe the user's employment history in a multi-sentence or paragraph narrative.

Although, such a narrative can be insightful to a human reader, the search system 110 may have difficulty parsing the narrative to identify relationships among the subject matter described in the narrative. For example, the user may describe the user's first three jobs in an opening paragraph and several paragraphs later, after having described the user's interests, expound upon the job duties of one of those jobs. The search system 110 may not be able identify the relationship between the job duties and the job and, thus, cannot use such information to identify the user's employment history as relevant to, for example, a human resource administration's search query for candidates' with that work history and skill set. In such scenarios, the graph search query apparatus 120 can provide an interactive tool to allow the user to construct a graph that represents the user's employment history, as described below.

The graph search query apparatus 120 can provide data to the client device 106 of a user to cause the client device 106 to display an interactive tool (e.g., the interactive tool provided to web resource custodians described above) that allows the user to construct a graph to represent the content at issue. For example, the user can use the interactive tool to construct a graph representing the user's employment history (e.g., based on the narrative). The tool provides functionality similar to that provided by the search page 220. For example, the interactive tool includes a menu of content elements (e.g., analogous to the graph search query elements) that the user can use to construct the graph. For example, the content elements can include a graph node for "Jobs." The user can use three "Jobs" elements to represent each of the user's three jobs and assign attributes to each of the elements specifying the type of job (e.g., customer service representative, production manager, telecommunications engineer, etc.). The user can use graph edges provided by the interactive tool to link the "Jobs" graph nodes and indicate the order in which the user had the jobs. Each link (e.g., graph edge) can have an attribute (e.g., the number of years spent performing the particular Job).

Once the user has constructed the graph, the interactive tool can generate metadata for the graph in a manner similar to that described above with respect to graph search query metadata 236 and content metadata sets 248 and 258. This employment metadata can then be accessed and used by the search system 110 to identify the user's profile page as relevant to a search query.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any techniques or of what may be claimed, but rather as descriptions of features specific to particular embodiments of particular techniques. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
receiving category data specifying a subject matter category of a search query;
providing user interface data to a client device, wherein the user interface data causes the client device to present an interactive user interface tool that allows a user of the client device to select graph search elements to generate a graph search query, wherein providing user interface data to the client device comprises:
selecting a proper subset of graph search elements from a set of graph search elements based on the category data, wherein the user interface data causes the client device to present the interactive user interface tool that allows the user of the client device to select from among graph search elements in the subset of graph search elements;

receiving, from the client device, a graph search query specifying user-selected graph search elements selected and arranged by a user to form a user-constructed graph, each graph search element corresponding to one of a graph node or a graph edge connecting graph nodes and representing relationships between the graph nodes, the graph search query specifying at least two graph nodes and at least one graph edge connecting the at least two graph nodes;

generating graph search query metadata representing the graph search elements of the graph search query and relationships of the graph search elements of the graph search query;

comparing the graph search query metadata to content metadata sets, wherein each content metadata set represents content elements of a content item presented on a respective web resource and relationships of the content elements;

determining similarity scores between the content metadata sets and the graph search query metadata based on the comparison; and selecting one or more of the web resources on which the content items are presented based at least in part on the similarity scores of the respective content metadata sets.

2. The method of claim 1, wherein determining similarity scores between the content metadata sets and the graph search query metadata comprises:

determining a distance measure between the graph search query metadata and at least one of the content metadata sets based on a distance function.

3. The method of claim 2, further comprising:
selecting the distance function based on the user-selected graph search elements.

4. The method of claim 1, further comprising:
accessing the content metadata sets from the respective web resources;
storing the content metadata sets in a data store; and
wherein comparing the graph search query metadata to content metadata sets comprises accessing one or more of the content metadata sets stored in the data store.

5. The method of claim 1, wherein the content metadata sets are embedded in the respective web resources.

6. The method of claim 1, further comprising:
receiving, with the graph search query, a text search query specifying one or more search terms; and
wherein selecting one or more of the web resources comprises:
selecting the one or more of the web resources based on the similarity scores and relevancy data specifying a relevancy between the one or more search terms and content on the one or more of the web resources.

7. The method of claim 1, wherein the content item is a graphical object and the content elements are graph nodes and graph edges of the graphical object.

8. The method of claim 1, further comprising:
generating a content metadata set based on a data model of a web resource on which the corresponding content item is presented.

9. A system comprising:
one or more data processing apparatuses; and
a data storage apparatus encoded with instructions that when executed by the one or more data processing apparatuses cause the one or more data processing apparatuses to perform operations comprising:

receiving category data specifying a subject matter category of a search query;

providing user interface data to a client device, wherein the user interface data causes the client device to present an interactive user interface tool that allows a user of the client device to select graph search elements to generate a graph search query, wherein providing user interface data to the client device comprises:

selecting a proper subset of graph search elements from a set of graph search elements based on the category data, wherein the user interface data causes the client device to present the interactive user interface tool that allows the user of the client device to select from among graph search elements in the subset of graph search elements;

receiving, from the client device, a graph search query specifying user-selected graph search elements selected and arranged by a user to form a user-constructed graph, each graph search element corresponding to one of a graph node or a graph edge connecting graph nodes and representing relationships between the graph nodes, the graph search query specifying at least two graph nodes and at least one graph edge connecting the at least two graph nodes;

generating graph search query metadata representing the graph search elements of the graph search query and relationships of the graph search elements of the graph search query;

comparing the graph search query metadata to content metadata sets, wherein each content metadata set represents content elements of a content item presented on a respective web resource and relationships of the content elements;

determining similarity scores between the content metadata sets and the graph search query metadata based on the comparison; and selecting one or more of the web resources on which the content items are presented based at least in part on the similarity scores of the respective content metadata sets.

10. The system of claim 9, wherein determining similarity scores between the content metadata sets and the graph search query metadata comprises:

determining a distance measure between the graph search query metadata and at least one of the content metadata sets based on a distance function.

11. The system of claim 10, wherein the instructions, when executed by the one or more data processing apparatuses, cause the one or more data processing apparatuses to further perform operations comprising:

selecting the distance function based on the user-selected graph search elements.

12. The system of claim 9, wherein the instructions, when executed by the one or more data processing apparatuses, cause the one or more data processing apparatuses to further perform operations comprising:

accessing the content metadata sets from the respective web resources;
storing the content metadata sets in a data store; and
wherein comparing the graph search query metadata to content metadata sets comprises accessing one or more of the content metadata sets stored in the data store.

13. The system of claim 9, wherein the content metadata sets are embedded in the respective web resources.

14. The system of claim 9, wherein the instructions, when executed by the one or more data processing apparatuses, cause the one or more data processing apparatuses to further perform operations comprising:

receiving, with the graph search query, a text search query specifying one or more search terms; and wherein selecting one or more of the web resources comprises:

selecting the one or more of the web resources based on the similarity scores and relevancy data specifying a relevancy between the one or more search terms and content on the one or more of the web resources.

15. The system of claim 9, wherein the instructions, when executed by the one or more data processing apparatuses, cause the one or more data processing apparatuses to further perform operations comprising:

generating a content metadata set based on a data model of a web resource on which the corresponding content item is presented.

16. A non-transitory computer-readable storage medium having instructions stored thereon, which, when executed by one or more data processors, causes the one or more processor to perform operations comprising:

receiving category data specifying a subject matter category of a search query;

providing user interface data to a client device, wherein the user interface data causes the client device to present an interactive user interface tool that allows a user of the client device to select graph search elements to generate a graph search query, wherein providing user interface data to the client device comprises:

selecting a proper subset of graph search elements from a set of graph search elements based on the category data, wherein the user interface data causes the client device to present the interactive user interface tool that allows the user of the client device to select from among graph search elements in the subset of graph search elements;

receiving, from the client device, a graph search query specifying user-selected graph search elements selected and arranged by a user to form a user-constructed graph, each graph search element corresponding to one of a graph node or a graph edge connecting graph nodes and representing relationships between the graph nodes, the graph search query specifying at least two graph nodes and at least one graph edge connecting the at least two graph nodes;

generating graph search query metadata representing the graph search elements of the graph search query and relationships of the graph search elements of the graph search query;

comparing the graph search query metadata to content metadata sets, wherein each content metadata set represents content elements of a content item presented on a respective web resource and relationships of the content elements;

determining similarity scores between the content metadata sets and the graph search query metadata based on the comparison; and selecting one or more of the web resources on which the content items are presented based at least in part on the similarity scores of the respective content metadata sets.

* * * * *